(No Model.) 2 Sheets—Sheet 1.
G. W. PACKER.
DISK HARROW.
No. 530,054. Patented Nov. 27, 1894.
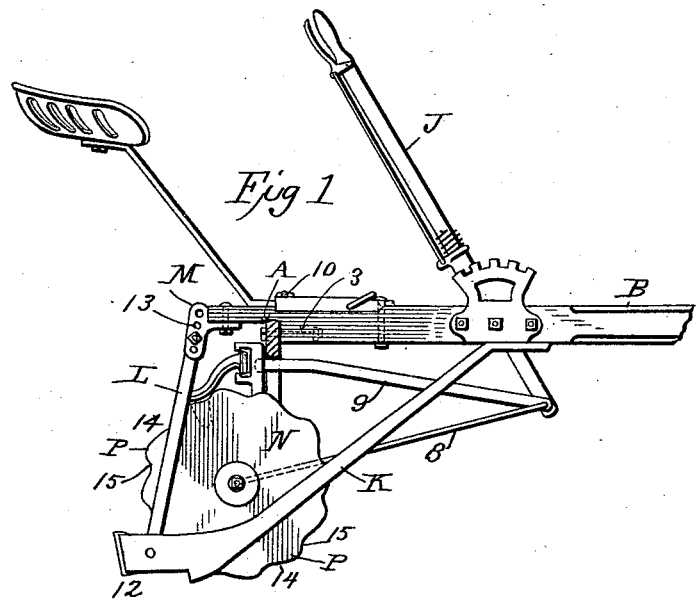
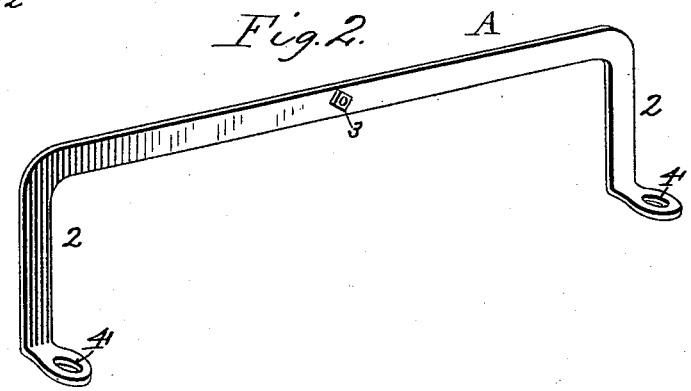
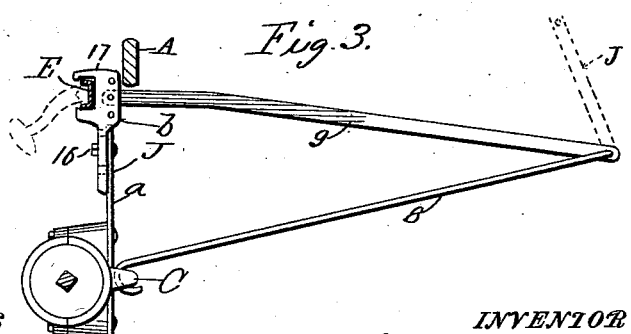
WITNESSES
Celo Burdine
Horace A. Dodge
INVENTOR
George W. Packer,
per his G. Manahan
his Attorney
THE NORRIS PETERS CO., PHOTO-LITHO., WASHINGTON, D. C.

(No Model.) 2 Sheets—Sheet 2.
G. W. PACKER.
DISK HARROW.
No. 530,054. Patented Nov. 27, 1894.
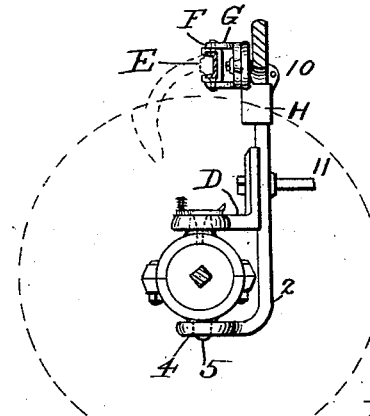
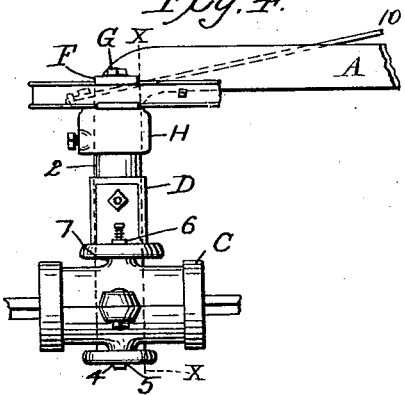
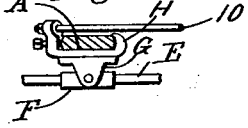
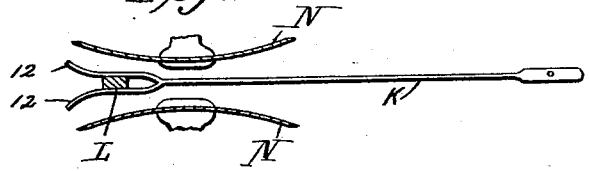
WITNESSES
INVENTOR
George W. Packer
per Jno. G. Manahan
Attorney

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

DISK HARROW.

SPECIFICATION forming part of Letters Patent No. 530,054, dated November 27, 1894.

Application filed June 8, 1894. Serial No. 513,918. (No model.)

*To all whom it may concern:*

Be it known that I, GEORGE W. PACKER, a citizen of the United States, residing at Rock Falls, in the county of Whiteside and State of Illinois, have invented certain new and useful Improvements in Disk Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in disk harrows and pertains more especially to the mechanism hereinafter described and claimed.

The first department of my invention relates to forming the periphery of the disks into projections having one sloping side and an opposite short abrupt side. In the movement of the disk, the sloping side of each projection precedes its abrupt side, whereby the action of the disk in the earth has what is known as the "shear cut."

The second part of my invention has reference to a vertical placed cutter having bifurcated blades curved laterally and drawn between the inner ends of the disk gangs to cut out or cultivate the strip of ground usually left untouched between the disk gangs.

The third department of my invention consists in certain improvements in the mode of seating and method of operating the disk gangs and scraper bar.

The several improvements aforesaid are illustrated in the accompanying drawings, in which—

Figure 1 is a sectional side elevation of a machine embodying my invention, taken in a line near one side of the tongue. Fig. 2 is a detail of the frame of the machine to which the other parts are directly or indirectly attached. Fig. 3 exhibits the method of seating the disk gangs and scraper bar, being a vertical longitudinal section at the point where the inner end of the gang is attached to the adjusting lever shown in Fig. 1. Fig. 4 is a detail showing the method of seating the disk gangs and scraper bar on the vertical portion or end of the frame A shown in Fig. 2. Fig. 5 is a sectional end view in the line x—x of Fig. 4. Fig. 6 is a detailed plan of the upper portion of Fig. 5. Fig. 7 is a detail plan of the cutter referred to.

Similar letters and figures refer to similar parts throughout the several views.

As the general form, proportion and relation of the several parts of the usual form of disk harrows are well known, I do not deem a specific description thereof necessary here but will restrict this specification to the parts involved in my invention.

A is the main frame of the machine (Fig. 2) which consists of a central horizontal transverse portion 1 and dependent portions 2. 2. The tongue B (Fig. 1) is seated with part of its rear end against the front side of the center of the part 1 of frame 2, and secured by bolt 3 passed from the rear through frame A into the rear end of the tongue B. The lower extremities of the ends 2 of frame A are turned back horizontally, and provided respectively with vertical openings 4. The box C in which the disk gang rotates is provided on its lower side with a trunnion 5 inserted in one of the openings 4 and which turns as a pivot for the disk gang in its horizontal adjustment. A trunnion 6 formed on the upper side of the box C oppositely to trunnion 5 is inserted in and adapted to rotate and vibrate laterally within the slot 7 formed transversely in the horizontal portion of the bracket D seated against the part 2 of the frame A and thus is afforded vertical oscillation to the disk gangs. (See Figs. 4 and 5.)

E is the scraper bar oscillated in the usual mode and loosely held in the clip F which is pivotally seated in the bracket G, the latter being pivoted horizontally in the sleeve H adjustably seated on the dependent portion 2 of the frame A a short distance above the bracket D. The pivotal seat of the clip F in the bracket G permits said bar to conform to the different angles at which the disk gangs may be set, while the pivotal attachment of bracket G to sleeve H permits the said scraper bar to follow the vertical lateral oscillation of said disk gang. The disk gang is connected to the usual regulating lever I by means of the rod 8 connecting the bottom of said lever and the box C. A corresponding bar 9 connects the lower end of said lever to the upper end of the vertical standard J seated on the disk gang near the inner end of the latter, and over the aforesaid attachment of rod 8. The standard J is constructed of the two parts $a$, $b$, lapped and united by cross bolt 16 and extensible one upon the other by a series of bolt holes in one or both of said parts, whereby the scraper bar E is elevated or depressed, and said standard lengthened or shortened to enable the one frame A to be used with different sized disks. The rear end of the bar 9 is adjusted vertically by means of a vertical series of bolt holes 17 in the part $b$ of standard J. The scraper bar E is sleeved also in the upper end of standard J, so that the bar 9 causes the inner end of the scraper bar E to conform to the movements of the inner end of the disk gang. As the bar 9 is projected under frame A it has the further function of acting as a stop against the uplifting of the inner end of the disk gang by striking against the under side of frame A (Fig. 3). A tie rod 10 extends across the rear of the tongue B and is attached at each of its ends to the sleeves H. Rods 11 are the usual draft rods attached at their front end to the side of the tongue B.

The cutter K which is interposed between the disk gangs is attached at its forward end to the under side of the tongue B and extended downward and backward to the earth and provided at its rear end with the divergent blades 12, 12 which loosen the earth in the strip otherwise left untouched between the disk gangs as aforesaid. A vertical bar L extends from between the blades 12 upward to a casting M on the rear end of the tongue B and serves to force the blades 12 into the ground. A vertical series of openings 13 is formed in the casting M by which the height of the cutter K can be adjusted to the variant diameters of different disks. The connecting bar of said cutter, springs sufficiently to permit of said adjustment.

The disks N are provided with a novel periphery, consisting of projections P each of which is formed of a long sloping side 14 and shorter abrupt sides 15. In the operation of the disks, the sloping side 14 precedes the abrupt side 15 and therefore the projections P enter the earth successively with a "shear cut." I find by experience with a full sized machine, that this special formation of the periphery of the disk N has a novel and peculiar operation and is very advantageous. It enters the ground gradually, thus avoiding the jar consequent upon a spoke-like formation of such periphery, and at the same time enters the earth more readily than the usual continuous circular periphery. The "shear cut" of the projections P avoids gouging or hoeing up the earth, but on the contrary the earth is lifted and pulverized more smoothly than by the usual form of disks.

What I claim as my invention, and desire to secure by Letters Patent of the United States, is—

1. In a disk harrow, the concavo-convex disks N, provided with a continuous cutting periphery, formed into radial, curved projections P, having a rear, longer side 14, and a front, shorter side 15, substantially as shown and for the purpose described.

2. In a disk harrow, the combination of the cutter K, attached at its front end to the frame of the machine, and formed at its rear end into outwardly diverging blades 12, adapted to be held in the earth, and the vertical bar L, seated, at its lower end, on the rear end of said cutter, and adjustably attached at its upper end to the frame of the machine, whereby the strip of earth between the disk gangs is split and thrown outwardly each way from the center at any desired depth, substantially as shown and for the purpose described.

3. In a disk harrow, the combination of the frame A provided with dependent ends 2, and openings 4 therein, bracket D seated on frame A, and provided with the transverse slot 7, box C provided with trunnion 5 inserted in opening 4, and trunnion 6 inserted in slot 7, and the tongue B suitably attached to the center of the frame A, and suitable means of changing the angles of said disk gangs substantially as shown and for the purpose specified.

4. In a disk harrow, the combination of the frame A, sleeve H adjustably seated thereon, bracket G pivotally attached to said sleeve, clip F pivotally seated on said bracket and a scraper bar E adapted to reciprocate in clip F transversely of the machine substantially as shown and for the purpose described.

5. In a disk harrow, the combination of the frame A, disk gangs seated thereon, standards J, constructed of two parts $a$, $b$, and seated on said gangs, bolt 16 adjustably connecting parts $a$ and $b$, adjustable bracket H and the scraper bar E carried by said bracket and said part $b$, substantially as shown and for the purpose described.

In testimony whereof I affix my signature in presence of two witnesses.

GEORGE W. PACKER.

Witnesses:
THOMAS A. GALT,
FRANK M. TRACY.